Patented Oct. 11, 1932

1,882,311

UNITED STATES PATENT OFFICE

JOHN B. AUSTIN, OF EAST CLEVELAND, OHIO

HIGH SPEED WELDING ELECTRODE

No Drawing. Application filed January 12, 1928, Serial No. 246,172. Renewed February 23, 1932.

This invention relates to electric arc welding and more particularly to electrodes adapted for high speed welding.

In the welding art, particularly in manufacturing operations, it frequently becomes desirable to form seam welds at high rates of speed in order that high production may be obtained at minimum cost. Moreover, such high speed welding is frequently preferably carried out by automatic welding in order to obtain a uniform product, to increase speed, and to decrease the labor cost. For such welding operations the desideratum is a welding electrode which will melt very rapidly under given amperages and which electrode will produce strong, solid, and non-porous weld metal even when the electrode is melted under very high currents. The slag produced by such an electrode should be substantially inappreciable in amount and the loss of electrode metal during the passage thereof through the arc should be a minimum. Furthermore, the electrode should provide stable arc characteristics under bad magnetic conditions, even when relatively high currents are employed. For the best welding results the electrode metal should melt and be transferred across the arc in small, rather than large, globules. In automatic seam welding the surface of the electrode or portions thereof should be electrically conductive.

Objects of this invention are to provide an electric arc welding electrode suitable for hand or automatic welding, the electrode having advantageous arc characteristics and melting rapidly under given amperages, with low metal losses, to provide weld metal of high quality.

Other objects of the invention will be apparent to those skilled in the art from the disclosure of my invention herein given.

I have found that a most advantageous electric arc welding electrode may be formed by associating with a ferrous rod, titanium in the metallic form, preferably as a coating. Talc is associated with said titanium, said talc having the function of improving the arc welding characteristics of the electrode as well as acting as a diluent to permit the titanium to be more uniformly distributed on the surface of the rod. A suitable binder may be employed to secure the titanium and talc to the rod.

The rod employed for the purposes of my invention is ferrous and preferably of low carbon steel of good quality. For ordinary welding purposes the carbon content of the rod preferably does not greatly exceed 0.10% carbon.

The titanium should be present in metallic form, in which form it acts also as an active deoxidizer. Thus the titanium may be present as the metallic element, as ferro-titanium or, where the carbon content of the weld is immaterial, as ferro-carbon-titanium, or in any other suitable metallic form. The titanium is employed in comminuted form, such as 100 mesh or finer. In the finished electrode the titanium is preferably present to the amount of 0.05 to 2.0%. If titanium is present in moderate excess, such excess is ordinarily not harmful, but is merely oxidized in the arc, performing, as far as I am aware, no useful function. Titanium in great excess, however, may cause porosity in the weld metal.

I have found talc to be exceedingly advantageous in that it confers very desirable arc welding characteristics upon the electrode. I employ it in comminuted form, such as 100 mesh or finer. The proportion of talc to titanium may be varied within relatively wide limits. Very small proportions of talc have proved advantageous. Moreover, talc in large proportions with respect to the amount of titanium has been employed with success. Thus, I have used the proportion of talc to titanium of about 85 parts by weight of talc to 15 parts of ferro-titanium with good results, and various intermediate mixtures have proven satisfactory. Apparently the main essential as to the proportions of the mixture is that in the finished electrode the talc be present in effective amount appreciably greater than a trace and the titanium be present to at least 0.05%. Coating mixtures containing the larger percentages of talc are advantageous in that thereby less titanium need be employed, thus decreasing the cost of the electrode.

Any suitable material may be employed as a binder, such as, for example, silicate of soda (water glass), shellac, or lacquer.

The coating materials may be associated with a metal rod in any suitable manner to form the electrode. Thus, a paste or suspension may be formed of the titanium, talc and binder, and said paste or suspension may be disposed on the exterior surface of the rod by painting, dipping, or otherwise. Where the electrode is to be used for automatic welding, the surface of the electrode is preferably electrically conductive in whole or in part. For automatic welding, therefore, the coating mixture may be present as a core in a hollow rod or may be disposed in depressions in the exterior surface of the rod.

To illustrate by specific example the advantageous features of my improved electrode, a coating of the following composition was prepared:

| | Parts by weight |
|---|---|
| Fe-Ti (25% Ti) of 200 mesh | 25 |
| Talc | 75 |
| Water | 66 |
| Silicate of soda (commercial) | 48 |

One gram of the above mixture was disposed uniformly on the exterior surface of a steel rod $\frac{1}{32}''$ in diameter, weighing 46 grams, by a dipping operation. After drying, the electrode was connected in an electric circuit and melted in the electric arc, using a direct current of 210 amperes. 18.9 grams of electrode were melted in 19 seconds, the rate of melting being more than 100% greater than with a bare rod. The amount of weld metal deposited was 14.8 grams, the metal loss being thus about 21.7%, a relatively low loss for high speed welding. The arc welding characteristics of the electrode were extremely satisfactory, the electrode metal melted in small globules, and the deposited weld metal was solid, homogeneous and substantially free from any porosity or blow holes. The deposited bead, moreover, was smooth, good penetration was obtained, and substantially no slag was formed.

While in the specific examples I have mentioned talc as the diluent, it will be understood that other diluents which do not appreciably retard the melting rate of the base rod during the welding operation, such as calcium fluoride or calcium chloride, may be employed. I prefer, however, to utilize talc because it not only acts as a diluent but also improves the arc welding characteristics of the electrode.

It will thus be seen that I have provided an electrode which will melt very rapidly under any given amperage.

It will be noted that I have provided an electric arc welding electrode providing excellent arc characteristics when melted under high currents.

It will further be noted that I have provided an electrode which will produce weld metal of extremely high quality, even when said electrode is melted under high amperages.

It will also be seen that I have provided an electrode of advantageous characteristics for high speed automatic welding.

It will further be noted that I have provided an electrode by means of which high production may be economically obtained in welding operations.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. A welding electrode particularly adapted for high speed welding, comprising a steel rod having associated therewith in the form of a coating ferro-titanium sufficient to provide a titanium content from 0.05 to 2% and talc in effective amount appreciably greater than a trace, said ferro-titanium being the only metallic ingredient present in said coating in appreciable amount.

2. A welding electrode particularly adapted for use in high speed welding, comprising a steel rod having associated therewith fluxing material consisting of ferro-titanium sufficient to provide a titanium content of from 0.05 to 2%, and talc in appreciable amount not over six times the weight of said ferro-titanium.

3. A welding electrode comprising a steel rod having associated therewith as the sole metallic coating constituent titanium in finely divided metallic form in amount at least substantially 0.05% whereby appreciably to increase the melting of the electrode and not greatly in excess of .2% whereby to prevent production of porosity of the weld metal, and talc uniformly associated with said titanium.

4. A welding electrode having rapid melting characteristics, comprising a low carbon steel rod and a coating associated with said rod in substantially uniform amounts lengthwise thereof, said coating consisting of a homogeneous mixture of ferro-titanium and talc, said ferro-titanium being present in said electrode in amount from 0.05 to 2%, said talc being present in appreciable amount not over six times the weight of the ferro-titanium.

5. A welding electrode particularly adapted for electric arc welding and arranged to melt rapidly with advantageous arc characteristics, said electrode comprising a low carbon steel rod and a coating thereon of ferro-titanium, talc and a binder, the titanium being present in approximately the amount of 0.07% of the weight of the electrode, the talc being present in the amount of about 0.35% of the weight of the electrode.

6. A welding electrode adapted for high speed welding, comprising a ferrous base rod having a flux containing not less than .05% to not greatly exceeding 2% titanium associated therewith, said flux being substantially free from fluxing ingredients which decrease the melting rate of the rod.

7. A welding electrode adapted for high speed welding, comprising a ferrous base rod having a flux associated therewith containing titanium either as a ferro-titanium, ferro-carbon-titanium or in the elementary form to provide a titanium content of not less than .05% to not greatly exceeding 2%, the titanium being secured to the electrode by means of a binder and said rod being substantially free from fluxing ingredients which substantially decrease the melting rate of the rod during welding operations.

8. A welding electrode adapted for high speed welding, comprising a ferrous base rod having a flux containing titanium in amounts not less than .05% to not greatly exceeding 2%, the titanium being secured to said rod by means of a binder which will not produce more than an appreciable amount of slag during the welding operations, and said rod being substantially free from fluxing or binding ingredients which will increase the amount of slag produced to more than an appreciable amount.

9. A welding electrode adapted for high speed welding, comprising a ferrous base rod having a flux containing titanium either as an alloy or in the elementary form, and a diluent associated therewith, the titanium being present in amounts ranging from not less than .05% to not greatly exceeding 2% and the diluent being present in quantities ranging from more than appreciable amounts up to 85 parts diluent to 3.75 parts titanium, said diluent being of such composition that it will not appreciably retard the melting rate of the rod and the flux being substantially free from other metals or fluxing ingredients having similar effects.

10. A welding electrode adapted for high speed welding, comprising a ferrous base rod having a flux containing titanium either as an alloy or in the elementary form, a diluent and a binder associated therewith, the titanium being present in amounts ranging from not less than .05% to not greatly exceeding 2%, the diluent being present in quantities ranging from more than appreciable amounts up to 85 parts diluent to 3.75 parts titanium, and the binder being present in sufficient amount to secure the flux to the rod, said flux being of such a composition that not more than an appreciable amount of slag will be deposited and being substantially free from metallic or fluxing ingredients which will appreciably retard the melting rate of the electrode.

11. A welding electrode adapted for high speed welding, comprising a ferrous base rod having a flux containing titanium either as an alloy or in the elementary form, and talc associated therewith, the titanium being present in amounts ranging from not less than .05% to not greatly in excess of 2% and the talc being present in amounts ranging from more than an appreciable quantity up to 85 parts talc to 3.75 parts titanium, said flux having such a composition that it will not deposit more than an appreciable amount of slag and being substantially free from metallic or fluxing ingredients which will appreciably retard the melting rate of the electrode.

In testimony whereof I affix my signature.

JOHN B. AUSTIN.